Figure 1:
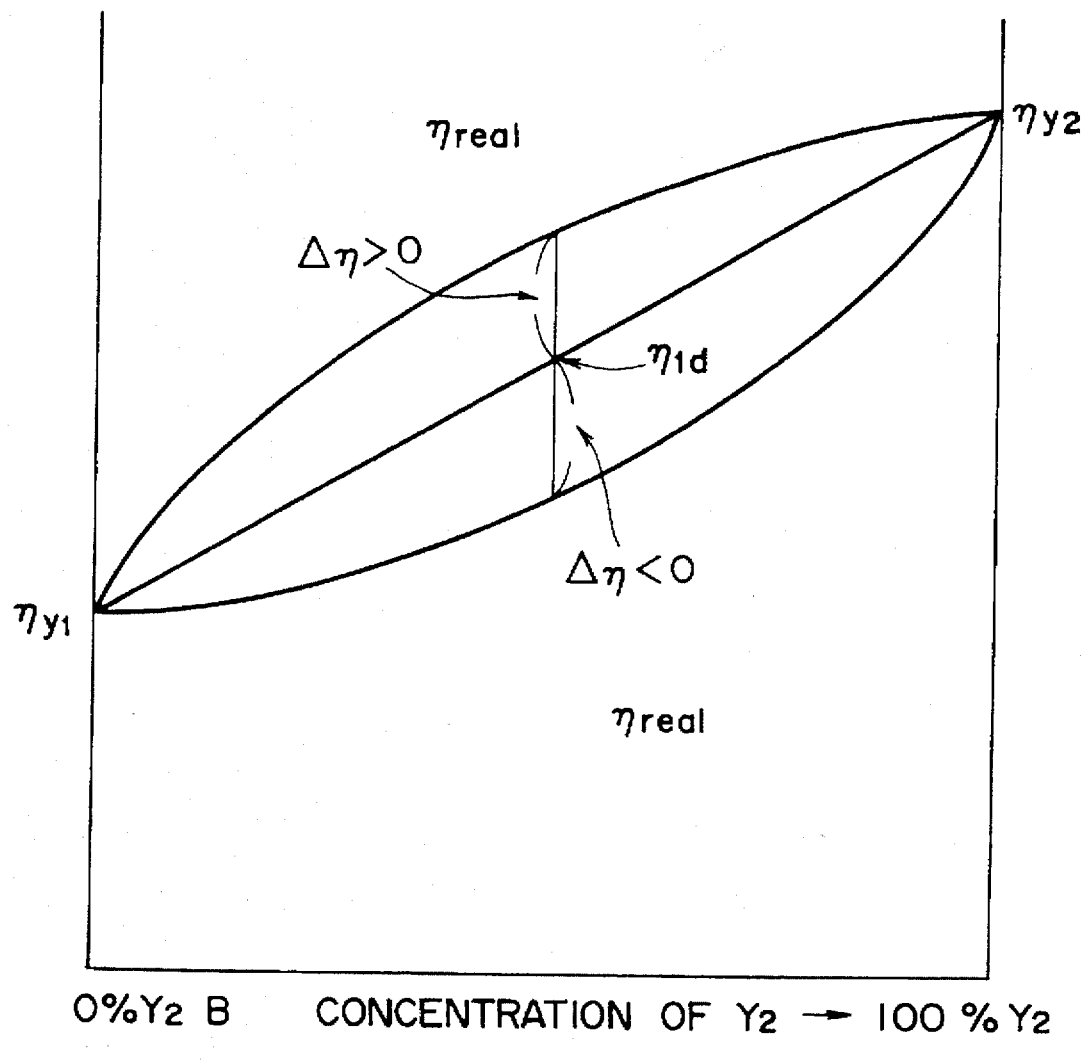

United States Patent [19]
Demus et al.

[11] Patent Number: 5,686,018
[45] Date of Patent: Nov. 11, 1997

[54] NEMATIC LIQUID CRYSTAL COMPOSITION

[75] Inventors: Dietrich Demus, Halle, Germany; Itsuo Shimizu, Ichiharashi; Youji Terui, Chibashi, both of Japan

[73] Assignee: Chisso Corporation, Osaka, Japan

[21] Appl. No.: 417,526

[22] Filed: Apr. 6, 1995

[30] Foreign Application Priority Data

Apr. 14, 1994 [JP] Japan ................................. 6-101960

[51] Int. Cl.$^6$ ............................. C09K 19/52; C09K 19/54
[52] U.S. Cl. ................... 252/299.01; 428/1; 252/299.5
[58] Field of Search .......................... 252/299.01, 299.5; 428/1

[56] References Cited

U.S. PATENT DOCUMENTS

| | | | |
|---|---|---|---|
| 3,976,591 | 8/1976 | Dubois et al. | 252/299.67 |
| 3,997,536 | 12/1976 | Boller et al. | 252/299.61 |
| 4,017,416 | 4/1977 | Inukai et al. | 252/299.65 |
| 4,066,570 | 1/1978 | Boller et al. | 252/299.01 |
| 4,096,086 | 6/1978 | Kanbe | 252/299.5 |
| 4,130,502 | 12/1978 | Eidenschink et al. | 252/299.63 |
| 4,173,545 | 11/1979 | Beguin et al. | 252/299.64 |
| 4,222,887 | 9/1980 | Matsufuji et al. | 252/299.01 |
| 4,402,855 | 9/1983 | Zann et al. | 252/299.65 |
| 4,410,445 | 10/1983 | Bauer et al. | 252/299.5 |
| 4,661,283 | 4/1987 | Sugimori et al. | 252/299.63 |
| 4,684,220 | 8/1987 | Shionozaki et al. | 252/299.5 |
| 4,822,519 | 4/1989 | Saito et al. | 252/299.61 |
| 4,879,060 | 11/1989 | Shionozaki et al. | 252/299.61 |

FOREIGN PATENT DOCUMENTS

| | | |
|---|---|---|
| 2 400 545 | 3/1979 | European Pat. Off. |
| 0 044 759 | 6/1981 | European Pat. Off. |
| 0 056 501 | 9/1981 | European Pat. Off. |
| 3 023 989 | 1/1982 | European Pat. Off. |
| 0 155 792 | 3/1985 | European Pat. Off. |
| 0 258 868 | 9/1987 | European Pat. Off. |
| 2 184 512 | 12/1973 | France. |
| 2 347 427 | 9/1976 | France. |
| 2 361 353 | 11/1977 | France. |
| 25 45 121 | 10/1974 | Germany. |
| 25 47 737 | 10/1975 | Germany. |
| 29 29 509 | 7/1978 | Germany. |
| 2 017 742 | 2/1979 | United Kingdom. |
| 2 003 864 | 3/1979 | United Kingdom. |
| 2 028 363 | 3/1980 | United Kingdom. |
| 2 161 808 | 7/1985 | United Kingdom. |

OTHER PUBLICATIONS

"A Method for Estimating Both the Solubility Parameters and Molar Volumes of Liquids," by Robert F. Fedors, *Polymer Engineering and Science*, Feb., 1974, vol. 14, No. 2.

J. Constant and E. P. Raynes, "Flow Aligned Viscosities of Cyanobiphenyls", *Mol. Cryst. Liq. Cryst.*, 1980, vol. 62, pp. 115–124.

H. Kneppe and F. Schneider, "Rotational Viscosity Coefficients, $\gamma_1$ for Mixtures of Nematic Liquid Crystals", *Mol. Cryst. Liq. Cryst.*, 1983, vol. 97, pp. 219–229.

"Advances in Liquid Crystal Research and Applications", Proceedings of the Third Liquid Crystal Conference of the Socialist Countries, Budapest, Aug. 27–31, 1979, vol. 1.

*Primary Examiner*—Shean C. Wu
*Attorney, Agent, or Firm*—Lowe, Price, LeBlanc & Becker

[57] ABSTRACT

A nematic liquid crystal composition having a low viscosity is provided, which composition is obtained by mixing two kinds of liquid crystal compositions having a difference of evaporation heats of 800 cal/mol or more and forming no complex; and by notably reducing its viscosity as compared with its ideal viscosity, improvement in the response speed of display element has become possible.

11 Claims, 1 Drawing Sheet

NEMATIC LIQUID CRYSTAL COMPOSITION

BACKGROUND OF THE INVENTION

1. Field of the Invention

This invention relates to a nematic liquid crystal composition used for liquid crystal display elements and use of the composition for electrooptical display elements.

2. Description of the Related Art

Liquid crystals can vary their optical characteristics by impressing voltage thereon; hence they are used as compositions for display elements by making use of the properties. The electrooptical display elements using the liquid crystals have been well known to person of ordinary skill in the art.

As such display elements, element having dynamic scattering effect, TN element having a twisted nematic structure, super-twisted nematic element (STN), guest-host element and super-birefringent effect element (SBE) have been known. Among these elements, the most general display element has a twisted nematic structure based upon Schadt-Helfrich's effect.

Among these liquid crystal display elements of conventional types, particularly, elements based upon twisted nematic cell have recently been increasing its importance. The reason consists in that such elements can be easily driven by small type battery under a relatively low voltage. Further, these display elements have been so far highest ones which can be applied to matrix display element capable of presenting a high information density.

However, in the practice aspect, as to TN cell of matrix display element mode, difficult problems have still been left behind. In order to solve these problems or improve the cell in a better direction, the liquid crystal materials used should be stable chemically and to heat, light and electric field and electromagnetic radiation. Further, the materials should have meso phase within a broad temperature range and a low viscosity, and the characteristics such as electric conductivity, dielectric anisotropy, optical anisotropy, etc. also should correspond to kinds and use application fields of the elements. As to matrix display device, low threshold voltage, broad viewing angle, high contrast, rapid response speed, etc. have been required.

Recently, improvement in the response speed has been particularly required, accompanying the broadened use application fields. The response speed is expressed as follows:

when response time: $t_{on}$, rotatory viscosity coefficient: $\gamma 1$, cell thickness: d, threshold voltage: Vc, impressed voltage: V, and relaxation time: $t_{off}$ then $$t_{on} = \gamma_1 d^2 / \{\pi^2 K (V^2/Vc^2 - 1)\}$$

$$t_{off} = \gamma_1 d^2 / (\pi^2 K)$$

$$K = K_{11} + (K_{33} - 2K_{22})/4$$

Namely, the response time is proportional to viscosity.

Reduction in the viscosity expresses shortening of response time.

As to the liquid crystal composition, generally compounds of several kinds or more are mixed to obtain physical properties corresponding to the object. As to the physical properties of the mixture, in the case where the resulting mixture does not form a complex, it has been generally said that the additive property of the physical properties of the respective mixed compounds comes into existence.

Namely, among the physical properties of the mixture, as to the viscosity $\eta$, when the viscosities of the components of the mixture are respectively referred to as $\eta_1, \eta_2, \eta_3, \ldots$, and the mol fractions of the components are respectively referred to as $X_1, X_2, X_3, \ldots$, then a relationship of $\eta = X_1\eta_1 + X_2\eta_2 + X_3\eta_3 + \ldots$, wherein $X_1 + X_2 + X_3 \ldots = 1$, comes into existence in an ideal state.

However, generally there is a difference between an ideal state and a real state, and when the viscosities in a real state and in an ideal state are respectively referred to as $\eta real$ and $\eta_{id}$, the relationship is expressed by the following equation:

$$\eta_{real} = \eta_{id} + \Delta\eta.$$

As to $\Delta\eta$, there are possibilities of $\Delta\eta < 0$, $\Delta\eta = 0$ and $\Delta\eta > 0$, and if $\Delta\eta < 0$, a composition having a lowest viscosity is obtained under given conditions. However, according to the present art, conditions affording $\Delta\eta < 0$ have not yet been clarified. As to the composition forming a complex, for example in the case where it is composed of a compound having —CN group, there has been known a case where it is composed of a compound having —CN group and NH-alkyl group.

Problem to be Solved by the Invention

In a nematic composition obtained by blending components $Y_1$ and $Y_2$ each containing at least one member of compounds, if the nematic composition does not form a complex, the viscosity of the composition depends upon the viscosities of the respective components and the mol fractions of the respective components. The viscosity of the composition includes a viscosity in a state almost near to the ideal state, a viscosity higher than that in the ideal state and a viscosity lower than that in the ideal state. The object of the present invention is to provide a composition having a viscosity wherein the viscosity in the real state is lower than that in the ideal state.

In short, the object is to find a condition of $\Delta\eta < 0$ and obtain a composition having a low viscosity. In addition, the real state refers to a practical state and the ideal state refers to an ideal state wherein an additive property comes into existence.

Means for Solving the Problem

The present invention has the following constitutions (1) to (11):

(1) In a nematic liquid crystal composition obtained by blending components $Y_1$ and $Y_2$ each containing at least one member of compounds, which hemeric composition does not form a complex, a liquid crystal composition having a low viscosity, characterized by blending Components $Y_1$ and $Y_2$ having a large difference between the vaporization heats of these components.

(2) A nematic liquid crystal composition according to item (1), wherein the difference between the evaporation heats of blended components $Y_1$ and $Y_2$ is 800 cal/mol or more.

(3) A nematic liquid crystal composition according to item (1), wherein said components $Y_1$ and $Y_2$ each independently are a compound expressed by the following formula (1):

$$R_1 - A_1 Z_1 A_2 - Z_2 - A_3 - Z_3 - A_4 - R_2 \qquad (1)$$

wherein $R_1$ represents an alkyl group of 1 to 15 carbon atoms, and one or two not adjacent $CH_2$ groups may be replaced by O, COO, OOC, CO, CH=CH or C≡C, and hydrogen atom may be replaced by a halogen atom;

$R_2$ represents an alkyl group of 1 to 15 carbon atoms or a halogenated alkyl group or a perhaloalkyl group of 1 to 10 carbon atoms and one or two not adjacent $CH_2$ groups, CX groups, CHX groups may be replaced by O, COO, OOC or CH=CH (X represents a halogen), and may be CN, F, Cl, Br or NCS; $A_1$, $A_2$, $A_3$ and $A_4$ each represent cyclohexane, cyclohexane wherein one or two not adjacent $CH_2$ groups may be replaced by O or S, cyclohexene, benzene, benzene wherein one or two hydrogen atoms may be replaced by F, Cl, Br, CN, $CH_3$ or $C_2H_5$, and one or two CH groups may be replaced by N, bicyclooctane, oxadiazole, thiadiazole, thiazole or dioxaborinane, and $A_3$ and $A_4$ may be single bond; and $Z_1$, $Z_2$ and $Z_3$ each represent single bond, $CH_2CH_2$, $(CH_2)_4$, CH=CH, C≡C, CF=CF, CHFCHF, $CF_2CH_2$, $CF_2CF_2$, $CH_2O$, $OCH_2$, COO or OOC, and when $A_3$ represents single bond, $Z_2$ represents single bond, and when $A_4$ represents single bond, $Z_3$ represents single bond.

(4) A hemeric liquid crystal composition according to item (3) wherein components $Y_1$ and $Y_2$ each independently contain at least one member of compounds expressed by the following formula (2):

$R_1—A_1—Z_1—A_2—R_2$ (2)

wherein $R_1$, $R_2$, $A_1$, $A_2$ and $Z_1$ are as defined in the formula (1)

(5) A nematic liquid crystal composition according to item (3) wherein components $Y_1$ and $Y_2$ each independently contain at least one member of compounds expressed by the following formula (3):

$R_1—A_1—Z_1—A_2—Z_2—A_3—R_2$ (3)

wherein $R_1$, $R_2$, $A_1$, $A_2$, $A_3$, $Z_1$ and $Z_3$ are as defined in the formula (1), but $A_3$ does not become a single bond.

(6) A nematic liquid crystal composition according to item (3) wherein components $Y_1$ and $Y_2$ each independently contain at least one member of compounds expressed by the following formula (4):

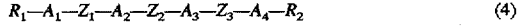
$R_1—A_1—Z_1—A_2—Z_2—A_3—Z_3—A_4—R_2$ (4)

wherein $R_1$, $R_2$, $A_1$, $A_2$, $A_3$, $A_4$, $Z_1$, $Z_2$ and $Z_3$ are as defined in the formula (1).

(7) A nematic liquid crystal composition according to item (3) wherein components $Y_1$ and $Y_2$ each independently contain at least one member of compounds expressed by the formulas (2) and (3).

(8) A nematic liquid crystal composition according to item (3) wherein components $Y_1$ and $Y_2$ each independently contain at least one member of compounds expressed by the formulas (2) and (4). (9) A nematic liquid crystal composition according to item (3) wherein components $Y_1$ and $Y_2$ each independently contain at least one member of compounds expressed by the formulas (3) and (4).

(10) A nematic liquid crystal composition according to item (3) wherein components $Y_1$ and $Y_2$ each independently contain at least one member of compounds expressed by the formulas (2), (3) and (4).

(11) An electrooptical display element using the respective compositions of item (1) to (10).

BRIEF DESCRIPTION OF THE ACCOMPANYING DRAWING

FIG. 1 shows a view illustrating the viscosity and the mixing proportion of liquid crystal mixture.

The constitution and effectiveness of the present invention will be described in more detail.

The viscosity $\eta$ of the mixture directed to the present invention also applies to the above description. Namely, when the respective viscosities of the mixture-constituting components are expressed by $\eta_1$, $\eta_2$, $\eta_3$, ..., and the respective mol fractions of the constituting components are expressed by $X_1$, $X_2$, $X_3$, ..., then $\eta=X_1\eta_1+X_2\eta_2+X_3\eta_3+...$, and $X_1+X_2+X_3+...=1$, in the ideal state.

There is a difference between $\eta$ in the ideal state and $\eta$ in the real state, and when the viscosities in the real state and the ideal state are expressed by $\eta_{real}$ and $\eta_{id}$, then the relation is expressed by the following equation:

$$\eta_{real}=\eta_{id}+\Delta\eta.$$

In general, in the case of liquid crystal mixture, $\Delta\eta>0$ is basic. However, in the case of a composite substance such as complex or an associated mixture, entirely different behaviors are exhibited. In the case of compositions which are difficult to form a composite substance such as complex or do not cause association, if a composition of $\Delta\eta<0$ is obtained, a composition having a low viscosity will be obtained. This is explained referring to FIG. 1.

When a composition $Y_1$ (viscosity $\eta_{y1}$) is mixed with a composition $Y_2$ (viscosity $\eta y_2$), a viscosity hid in an ideal state is on a linear line connecting $\eta y_1$ to $n_{y2}$, and a viscosity $\eta_{real}$ in a real state is fundamentally above the above linear line. Namely, the viscosity in the real state is higher than that in the ideal state. If components $Y_1$ and $Y_2$ are chosen so that the viscosity of the mixture may be below the linear line, a composition having a low viscosity is obtained.

In order to effectively lower the viscosity of the composition, namely in Order to maximize the value of $|\Delta\eta|$, the content of component $Y_1$ in the composition of mixture of components $Y_1$ with $Y_2$ is preferably 20 to 80%, more preferably 30 to 70%.

However, the content is not limited to such a mixing ratio, As can be understood from FIG. 1, when the content is close to 100%, the $|\Delta\eta|$ increases. As a result of various research of a condition where $\Delta\eta<0$, it has been found that if the difference between evaporation heats of two components to be mixed is 800 cal/mol or more, it has been found that the viscosity becomes smaller than that in an ideal state, to obtain a composition having a lowest viscosity. Thus, the present inventors have achieved the present invention.

The evaporation heads of the respective components were calculated as follows:

The calculation of the evaporation heats of compounds constituting the respective components relied upon the method Polymer Engineering And Science, Vol. 14, No. 2, 147 (1974).

When the evaporation heats of the respective compounds constituting the components are referred to as $H_1$, $H_2$, $H_3$, ..., and the mol fractions of these compounds are referred to as $X_1$, $X_2$, $X_3$, ..., then the evaporation heats $H=H_1 \cdot X_1+H_2 \cdot X_2+H_3 \cdot X_3+...$, wherein $X_1+X_2+X_3+...=1$.

When the evaporation heat of component $Y_1$ and that of component $Y_2$ are respectively referred to as $H_{y1}$ and $H_{y2}$, then when $|H_{y1}-H_{y2}|>800$ cal/mol, a composition having a viscosity lower than that in the ideal state is obtained.

A suitable composition of the present invention consists of components $Y_1$ and $Y_2$, and the components $Y_1$ and $Y_2$ each are composed of at least one kind of compounds of the following formula (1), independently of each other:

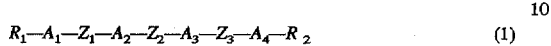
(1)

(the respective compounds being independent of each other).

In the formula (1), $R_1$ represents an alkyl group of 1 to 15 carbon atoms, and one or two not adjacent $CH_2$ groups therein may be replaced by O, COO, OOC, CO, CH=CH or C≡C and hydrogen atom may be replaced by halogen atom;

$R_2$ represents an alkyl group of 1 to 15 carbon atoms, a halogenated alkyl or a perhaloalkyl of 1 to 15 carbon atoms, and one or two not adjacent $CH_2$s, $CX_2$s or CHXs therein (wherein X represents a halogen) may be replaced by O, COO, OOC or CH=CH and can be CN, F, Cl, Br or NCS;

$A_1$, $A_2$, $A_3$ and $A_4$ each represent cyclohexane; cyclohexane, one or two not adjacent $CH_2$s in which may be replaced by O or S; cyclohexene; benzene; benzene, one or two H atoms in which may be replaced by F, Cl, Br, CN, CH or $C_2H_5$; benzene one or two CHs in which may be replaced by N; bicyclooctane, oxathiazole, thiadiazole, thiazole or dioxybornane and $A_3$ and $A_4$ may be single bond;

$Z_1$, $Z_2$ and $Z_3$ each represent single bond, $CH_2CH_2$, $(CH_2)_4$, CH=CH, C≡C, CF=CF, CHFCHF, $CF_2CH_2$, $CF_2CF_2$, $CH_2O$, $OCH_2$, COO or OOC, and when $A_3$ represents single bond, then $Z_2$ represents single bond, and when $A_4$ represents single bond, then $Z_3$ represents single bond.

In more detail, component $Y_1$ and component $Y_2$ each are a composition containing at least one kind of compounds expressed by the following formulas (2), (3) and (4):

 (2)

 (3)

 (4)

wherein $R_1$, $R_2$, $A_1$, $A_2$, $A_3$, $A_4$, $Z_1$, $Z_2$ and $Z_3$ each are as defined above, but, in the formulas (3) and (4), $A_3$ and $A_4$ each do not become single bond.

Namely, composition composed of group of compounds of the formula (2), that composed of group of compounds of the formula (3), that composed of group of compounds of the formula (4), that composed of group of compounds of the formulas (2) and (3), that composed of group of compounds of the formulas (2) and (4), that composed of group of compounds of the formulas (3) and (4) and that composed of group of compounds of the formulas (2), (3) and (4), are suitable.

Compounds of the formula (2) include the following compounds:

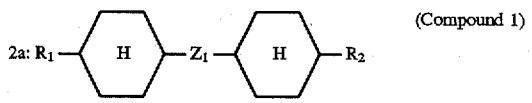
(Compound 1)

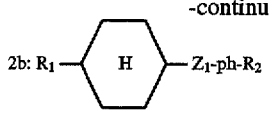
(Compound 2)

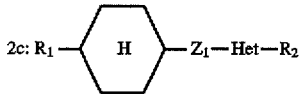
(Compound 3)

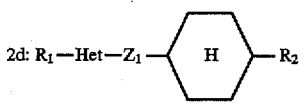
(Compound 4)

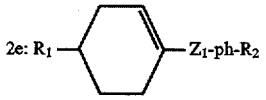
(Compound 5)

 (Compound 6)

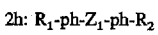 (Compound 7)

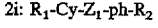 (Compound 8)

2i: $R_1$-Cy-$Z_1$-ph-$R_2$ (Compound 9)

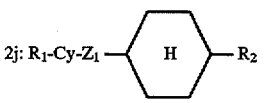
(Compound 10)

2k: $R_1$-ph-$Z_1$-Cy-$R_2$ (Compound 11)

2l: $R_1$-Cy-$Z_1$—Het—$R_2$

In these compounds, ph represents benzene, and benzene which may be replaced by one or two F, Cl, Br, CN, $CH_3$ or $C_2H_5$:

Het represents dioxane, dicyan, pyridine, pyrimidine, pyradine, pyridazine, oxadiazole, thiadiazole, thiazole or dioxaborinan;

Cy represents cyclooctane;

$R_1$ represents alkyl, alkyloxy, alkyloxyalkyl, alkenyl, alkenyloxy, alkyloxyalkyloxy, alkyloxyalkyloxyalkyl, alkylcarbonyloxy, alkyloxycarbonyl, alkylcarbonyloxyalkyl, alkyloxycarbonyl alkyl, alkylcarbonyloxyalkyloxy or alkyloxycarbonylalkyloxy, each of 1 to 15 carbon atoms;

$R_2$ represents alkyl, alkyloxy, alkyloxyalkyl, alkenyl, alkenyloxy, alkyloxyalkyloxy, alkyloxyalkyloxyalkyl, alkylcarbonyloxy, alkyloxycarbonyl, alkylcarbonyloxyalkyl, alkyloxycarbonylalkyl, alkylcarbonyloxyalkyloxy, alkyloxycarbonylalkyloxy, alkylalkyne, alkylalkyneoxy, halogenated alkyl, halogenated alkyloxy, each of 1 to 15 carbon atoms, F, Cl, Br, CN, NCS, $CF_3$, $OCF_3$, $CHF_2$ or $OCHF_2$; and $Z_1$ represents single bond, $CF_2CH_2$, $(CH_2)_4$, CH=CH, C≡C, CF=CF, CFHCFH, $CH_2CH_2$, $CF_2CF_2$, $CH_2O$, $OCH_2$, COO or OOC.

Compounds of the formula (3) include the following compounds:

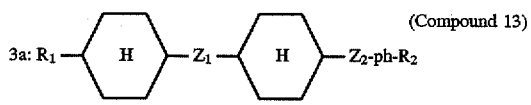
(Compound 13)

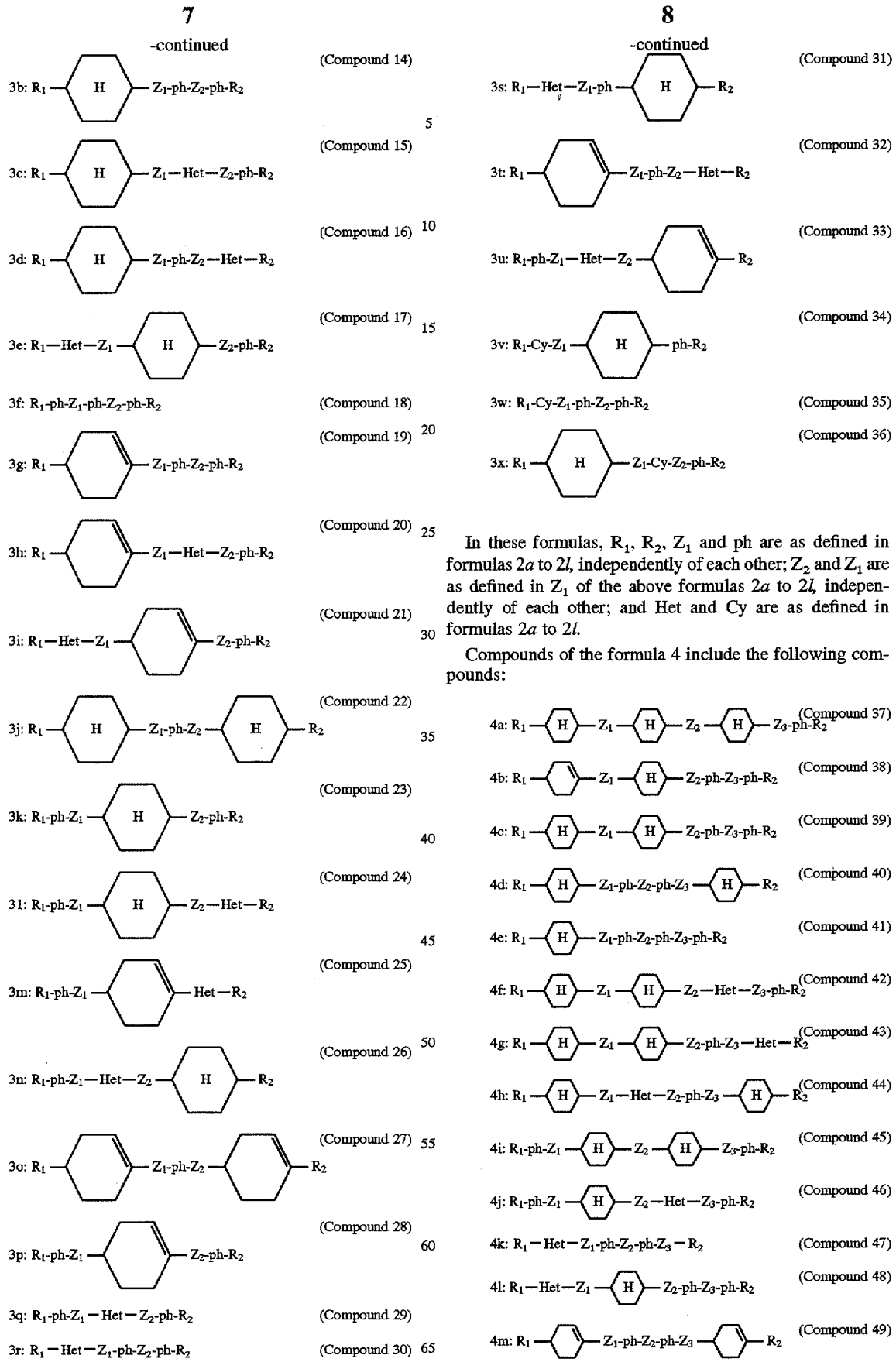
In these formulas, $R_1$, $R_2$, $Z_1$ and ph are as defined in formulas 2a to 2l, independently of each other; $Z_2$ and $Z_1$ are as defined in $Z_1$ of the above formulas 2a to 2l, independently of each other; and Het and Cy are as defined in formulas 2a to 2l.
Compounds of the formula 4 include the following compounds:

-continued

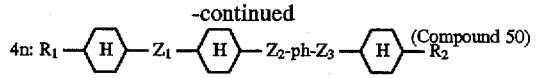 (Compound 50)

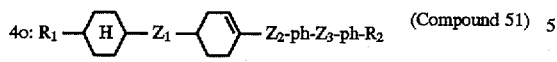 (Compound 51)

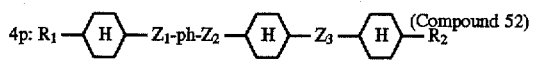 (Compound 52)

4q: R₁—⟨H⟩—Z₁-ph-Z₂-ph-Z₃—Het—R₂ (Compound 53)

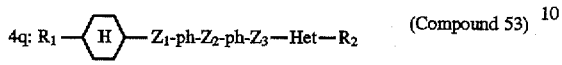 (Compound 54)

4s: R₁-ph-Z₁—⟨H⟩—Z₂-ph-Z₂-ph-R₂ (Compound 55)

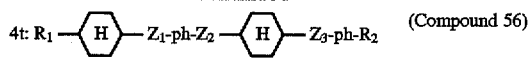 (Compound 56)

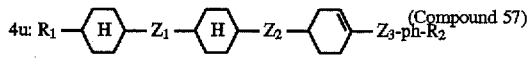 (Compound 57)

4x: R₁-ph-Z₁-ph-Z₂-ph-Z₃-ph-R₂ (Compound 58)

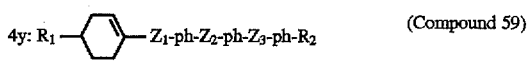 (Compound 59)

In these formulas, $R_1$, $R_2$, ph and Het are as defined in the formulas 2a–2l and 3a–3x; and $Z_3$, $Z_1$ and $Z_2$—are as defined in $Z_1$ of 2a to 2l, independently of each other. Concrete examples of these compounds and their evaporation heats are shown below. However, compounds are not limited to these exemplified compounds.

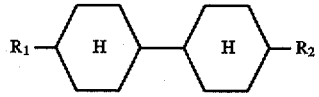

($R_1 = C_3H_7$, $R_2 = C_3H_7$, evaporation heat H = 20190 cal/mol or less, and hereinafter, evaporation heat is represented by H, and cal/mol is omitted.) (Compound 60)

($R_1 = C_3H_7$, H = 23825) (Compound 61)

($R_1 = C_3H_7$, H = 19425) (Compound 62)

($R_1 = R_2 = C_3H_7$, H = 24750) (Compound 63)

($R_1 = R_2 = C_3H_7$, H = 19430) (Compound 64)

($R_1 = R_2 = C_3H_7$, H = 27110) (Compound 65)

($R_1 = C_3H_7$, H = 23885) (Compound 66)

($R_1 = R_2 = C_3H_7$, H = 25770) (Compound 67)

($R_1 = C_3H_7$, H = 24845) (Compound 68)

-continued
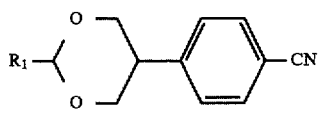
(Compound 69)
($R_1 = C_3H_7$, H = 23065)
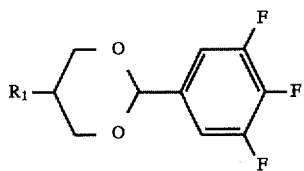
(Compound 70)
($R_1 = C_3H_7$, H = 18615)
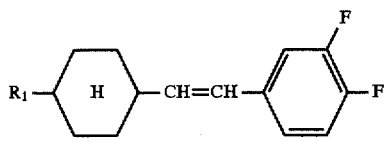
(Compound 71)
($R_1 = C_3H_7$, H = 21485)
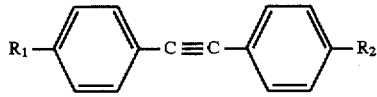
(Compound 72)
($R_1 = R_2 = C_3H_7$, H = 25610)
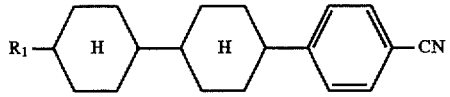
(Compound 73)
($R_1 = C_3H_7$, H = 30435)
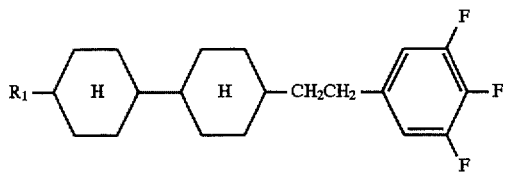
(Compound 74)
($R_1 = C_3H_7$, H = 28345)
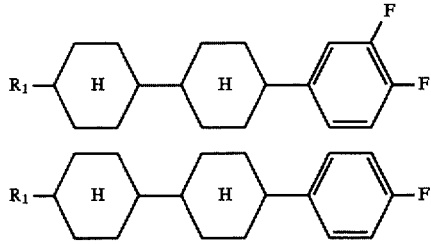
(Compound 75)
($R_1 = C_3H_7$, H = 26035)
(Compound 76)
($R_1 = C_3H_7$, H = 25335)
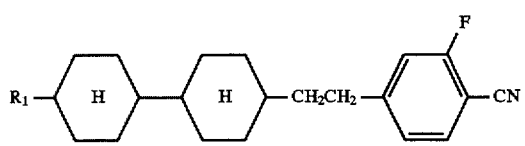
(Compound 77)
($R_1 = C_3H_7$, H = 33795)
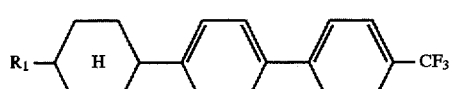
(Compound 78)
($R_1 = C_3H_7$, H = 26375)
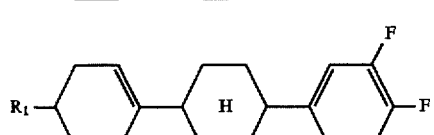
(Compound 79)
($R_1 = C_3H_7$, H = 19485)
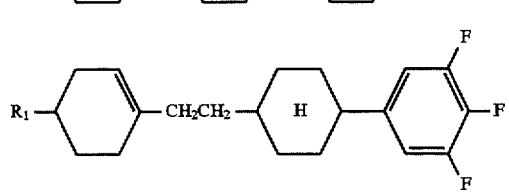
(Compound 80)
($R_1 = C_3H_7$, H = 28405)

-continued

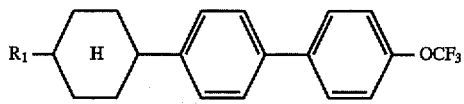
(Compound 81)
($R_1 = C_3H_7$, H = 26155)

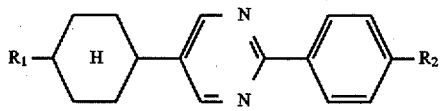
(Compound 82)
($R_1 = C_3H_7$, $R_2 = OC_3H_7$, H = 33180)

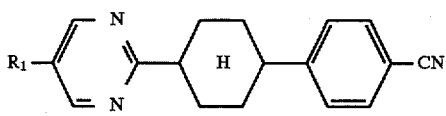
(Compound 83)
($R_1 = C_3H_7$, H = 34995)

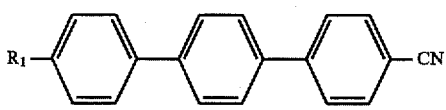
(Compound 84)
($R_1 = C_3H_7$, H = 32475)

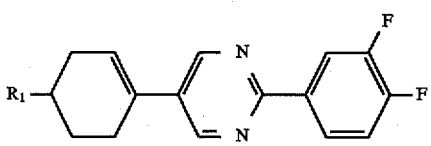
(Compound 85)
($R_1 = C_3H_7$, H = 30655)

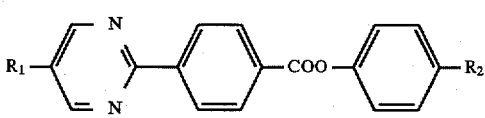
(Compound 86)
($R_1 = R_2 = C_3H_7$, H = 37700)

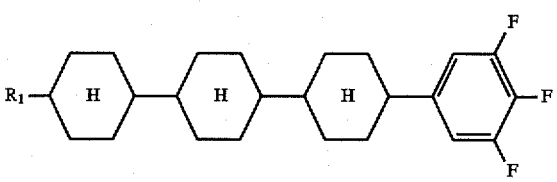
(Compound 87)
($R_1 = C_3H_7$, H = 32595)

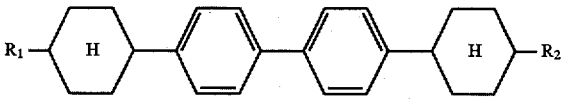
(Compound 88)
($R_1 = R_2 = C_3H_7$, H = 35450)

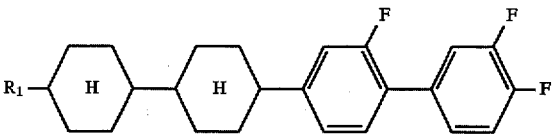
(Compound 89)
($R_1 = C_3H_7$, H = 34665)

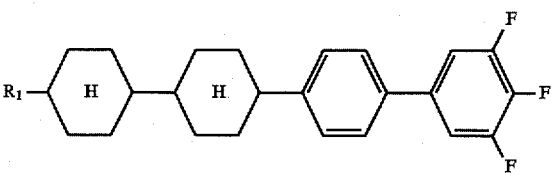
(Compound 90)
($R_1 = C_3H_7$, H = 33615)

The present invention will be described by way of Examples, but it should not be construed to be limited thereto.

EXAMPLE 1

As to composition A having a measured viscosity value at 20° C. of 24.8 cp, its evaporation heat was calculated according to a method of Robert F. Fedors (Polymer Eng. and Sci., Vol. 14, No. 2, 147 (1974)) (this applies to the succeeding evaporation heats), to obtain $Hy_1 = 27215$ cal/mol. As to composition B having a measured viscosity value at 20° C. of 10.7 cp, its evaporation heat was $Hy_2 = 22010$ cal/mol. When composition A was mixed with composition B in an equimolar ratio (1:1), the resulting $\eta_{real}$ was 16.1 cp.

When the compositions A and B each were presumed to be an ideal liquid and the viscosity of a mixed composition of compositions A and B in a ratio of 1:1 was calculated (presuming that the additive property comes into existence), $\eta_{id} = 17.75$ cp was obtained. The difference between the evaporation heat of composition A and that of composition B was $|H_{y1} - H_{y2}| = 5202$ cal/mol and the difference between the viscosity in the real state and that in the ideal state was $\Delta\eta = -1.65$ cp. (Note: the components of the compositions A and B are shown in Examples 2 to 6.)

EXAMPLES 2 TO 6

As shown in the following Table 1, compositions of each two kinds were mixed, followed by measuring the respective viscosities and then calculating the difference between the respective evaporation heats.

EXAMPLE 7

The viscosity of composition G at 67° C. shown in Table 3 mentioned below was 13 cp and the evaporation heat was 33085 cal/mol.

With this composition (50 mol %) was mixed a compound

TABLE 1

| Example | Kind of composition | Mixing ratio | Viscosity | Evaporation heat | Viscosity of mixed composition, $\eta_{real}$ | Ideal viscosity $\eta_{id}$ | Reduction in viscosity $\Delta\eta$ | Difference between evaporation heats $|H_{y1}-H_{y2}|$ |
|---|---|---|---|---|---|---|---|---|
| 2 | C + D | 1:1 | C = 21.2* | C = 28385 | 13.4* | 16.85 | −3.45 | 5225 |
|   |       |     | D = 12.5* | D = 23160 |       |       |       |      |
| 3 | E + D | 1:1 | E = 14.1* | E = 26415 | 10.3* | 13.3  | −3.0  | 3255 |
|   |       |     | D = 12.5* | D = 23166 |       |       |       |      |
| 4 | C + A | 1:1 | C = 31.7  | C = 28385 | 24.8  | 28.4  | −3.6  | 1170 |
|   |       |     | A = 25.1  | A = 27215 |       |       |       |      |
| 5 | E + A | 1:1 | E = 14.7  |           | 17.0  | 19.9  | −2.9  | 800  |
| 6 | B + F | 1:1 | B = 10.7  | B = 22010 | 19.7  | 24.45 | −4.75 | 6369 |
|   |       |     | F = 38.2  | F = 28379 |       |       |       |      |

Symbol * indicates viscosity cp at 30° C., and others indicate viscosity at 20° C.

TABLE 2

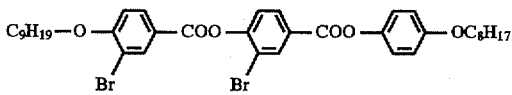

(viscosity: 457 cp at 67° C., evaporation heat: 60413 cal/mol) (50 mol %). The observed value of the viscosity of this mixture was 72.7 cp at 67° C. Since the viscosity in the ideal state is 235 cp at 67° C., the difference between the observed value and the ideal value was −162.3 cp. The difference between the evaporation heats was 27328 cal/mol.

The components of the composition G are described in the following Table 3:

TABLE 3

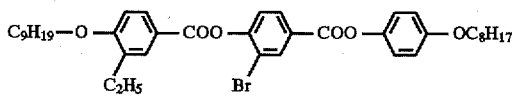

| | |
|---|---|
| $CH_3-O-\phi-COO-\phi-OC_6H_{13}$ | 24 mol % |
| $C_5H_{11}-O-\phi-COO-\phi-OC_8H_{17}$ | 27 mol % |
| $C_6H_{13}-O-\phi-COO-\phi-O-C_7H_{15}$ | 12 mol % |
| $C_6H_{13}-\phi-COO-\phi-O-C_4H_9$ | 12 mol % 37 mol % |

EXAMPLE 8

With the composition G (89 mol %) was mixed a compound

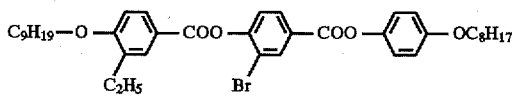

(viscosity: 145.8 cp at 67° C., evaporation heat: 60413 cal/mol) (11 mol %).

The observed value of the viscosity of this mixture is 18.9 cp at 67° C. and the viscosity in the ideal state at 67° C. is 27.6 cp. The difference between the observed value and the ideal value was −8.7 cp and the difference between the evaporation heats was 27328 cal/mol.

Effectiveness of the Invention

As described in the above Examples, in the case of a nematic liquid crystal composition obtained by mixing component $Y_1$ with component $Y_2$, each containing at least one compound, which composition does not form any complex, when components $Y_1$ and $Y_2$, the difference of the evaporation heats of which is 800 cal/mol or more, were mixed, then it has been possible to provide a composition having a viscosity lower than the viscosity of the composition in the ideal state.

What we claim is:

1. A nematic liquid crystal composition comprising two components, each of said components containing at least one compound, wherein the composition does not form a complex and has a viscosity lower than ideal viscosity, and wherein the composition is obtained by blending components having a difference of at least 800 cal/mol between vaporization heats of the components with the proviso that 4-n-pentoxy-4'-cyanobiphenyl and 4-n-pentyl-4"-cyano-p-terphenyl are excluded.

2. A nematic liquid crystal composition according to claim 1, wherein said components each independently are at least one compound expressed by the following formula (1):

$$R_1-A_1-Z_1-A_2-Z_2-A_3-Z_3-A_4-R_4 \quad (1)$$

wherein $R_1$ represents an alkyl group of 1 to 15 carbon atoms, and one or two not adjacent $CH_2$ groups may be replaced by O, COO, OOC, CO, CH=CH or C≡C, and hydrogen atom may be replaced by a halogen atom;

$R_2$ represents an alkyl group of 1 to 15 carbon atoms or a halogenated alkyl group or a perhaloalkyl group of 1 to 10 carbon atoms and one or two not adjacent $CH_2$ groups, CX groups, CHX groups may be replaced by O, COO, OOC or CH=CH (X represents a halogen), and may be CN, F, Cl, Br or NCS; $A_1$, $A_2$, $A_3$ and $A_4$ each represent cyclohexane, cyclohexane wherein one or two not adjacent $CH_2$ groups may be replaced by O or S, cyclohexene, benzene, benzene wherein one or two hydrogen atoms may be replaced by F, Cl, Br, CN, $CH_3$ or $C_2H_5$, and one or two CH groups may be replaced by N, bicyclooctane, oxadiazole, thiadiazole, thiazole or dioxaborinane, and $A_3$ and $A_4$ may be single bond; and $Z_1$, $Z_2$, and $Z_3$ each represent a single bond, $CH_2CH_2$, $(CH_2)_4$, CH=CH, C≡C, CF=CF, CHFCHF, $CF_2CH_2$, $CF_2CF_2$, $CH_2O$, $OCH_2$, COO or OOC, and when $A_3$ represents single bond, $Z_2$ represents single bond, and when $A_4$ represents single bond, $Z_3$ represents single bond.

3. A nematic liquid crystal composition according to claim 2, wherein said components each independently contain at least one member of compounds expressed by the following formula (2):

$$R_1-A_1-Z_1-A_2-R_2 \quad (2)$$

wherein $R_1$, $R_2$, $A_1$, $A_2$ and $Z_1$ are as defined in the formula (1).

4. A nematic liquid crystal composition according to claim 2, wherein said components each independently contain at least one member of compounds expressed by the following formula (3):

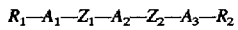
$$R_1—A_1—Z_1—A_2—Z_2—A_3—R_2 \quad (3)$$

wherein $R_1$, $R_2$, $A_1$, $A_2$, $A_3$, $Z_1$ and $Z_2$ are as defined in the formula (1), but $A_3$ does not become a single bond.

5. A nematic liquid crystal composition according to claim 2, wherein said components each independently contain at least one member of compounds expressed by the following formula (4):

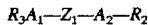
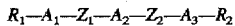
$$R_1—A_1—Z_1—A_2—Z_2—A_3—Z_3—A_4—R_2 \quad (4)$$

wherein $R_1$, $R_2$, $A_1$, $A_2$, $A_3$, $A_4$, $Z_1$, $Z_2$ and $Z_3$ are as defined in the formula (1) provided that in formula (4), $A_3$ and $A_4$ each do not become a single bond.

6. A nematic liquid crystal composition according to claim 2, wherein said components each independently contain at least one member of compounds expressed by formulas (2) and (3):

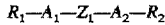
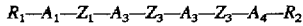
$$R_3A_1—Z_1—A_2—R_2 \quad (2)$$
$$R_1—A_1—Z_1—A_2—Z_2—A_3—R_2 \quad (3)$$

wherein $R_1$, $R_2$, $A_1$, $A_2$, $A_3$, and $Z_1$, $Z_2$ are as defined in the formula (1), but $A_3$ does not become a single bond.

7. A nematic liquid crystal composition according to claim 2, wherein said components each independently contain at least one member of compounds expressed by formulas (2) and (4):

$$R_1—A_1—Z_1—A_2—R_2 \quad (2)$$
$$R_1—A_1—Z_1—A_3—Z_3—A_3—Z_3—A_4—R_2 \quad (4)$$

wherein $R_1$, $R_2$, $A_1$, $A_2$, $A_3$, $A_4$, $Z_1$, $Z_2$ and $Z_3$ are as defined in the formula (1), provided that in formula (4), $A_3$ and $A_4$ each do not become a single bond.

8. A nematic liquid crystal composition according to claim 2, wherein said components each independently contain at least one number of compounds expressed by the formulas (3) and (4):

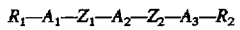
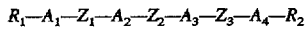
$$R_1—A_1—Z_1—A_2—Z_2—A_3—R_2 \quad (3)$$
$$R_1—A_1—Z_1—A_2—Z_2—A_3—Z_3—A_4—R_2 \quad (4)$$

wherein $R_1$, $R_2$, $A_1$, $A_2$, $A_3$, $A_4$, $Z_1$, $Z_2$ and $Z_3$ are as defined in the formula (1), provided that in formulas (3) and (4), $A_3$ and $A_4$ each do not become a single bond.

9. A nematic liquid crystal composition according to claim 2, wherein said components each indenpendently contain at least one member of compounds expressed by the formulas (2), (3), and (4):

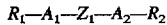
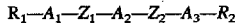
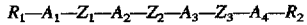
$$R_1—A_1—Z_1—A_2—R_2 \quad (2)$$
$$R_1—A_1—Z_1—A_2—Z_2—A_3—R_2 \quad (3)$$
$$R_1—A_1—Z_1—A_2—Z_2—A_3—Z_3—A_4—R_2 \quad (4)$$

wherein $R_1$, $R_2$, $A_1$, $A_2$, $A_3$, $A_4$, $Z_1$, $Z_2$ and $Z_3$ are as defined in the formula (1), provided that in formulas (3) and (4), $A_3$ and $A_4$ each do not become a single bond.

10. An electro optical display element comprising the liquid crystal composition according to any one of claims 2–5, 1, or 6–9.

11. A process for producing a nematic liquid crystal composition having a viscosity lower than the ideal viscosity and not forming a complex, comprising the steps of:

blending components $Y_1$ and $Y_2$ having a difference of 800 cal/mol or more between the vaporization heats of these components.

* * * * *

UNITED STATES PATENT AND TRADEMARK OFFICE
CERTIFICATE OF CORRECTION

PATENT NO. : 5,686,018
DATED : November 11, 1997
INVENTOR(S) : Dietrich DEMUS et al.

It is certified that error appears in the above-identified patent and that said Letters Patent is hereby corrected as shown below:

Column 3, line 3, change "C=C" to --C≡C--.
Column 3, line 19, change "C=C" to --C≡C--.
Column 3, line 61, open new line with "(9)".
Column 4, line 57, change "heads" to --heats--.
Column 5, line 18, change "C=C" to --C≡C--.
Column 6, line 36, change "dicyan" to --dithiane--.
Column 6, line 40, change "cyclooctane" to --bicycloctane--.
Column 6, line 57, change "C=C" to --C≡C--.
Column 10, line 16, change "Z₂-are" to --Z₂ are--.
Column 17, in Table 3, change "12 mol% 37 mol%" to --37 mol%--.

Signed and Sealed this

Twenty-first Day of July, 1998

Attest:

BRUCE LEHMAN

*Attesting Officer*   Commissioner of Patents and Trademarks